US012681642B2

(12) United States Patent
Wu et al.

(10) Patent No.: US 12,681,642 B2
(45) Date of Patent: Jul. 14, 2026

(54) ADDRESS MAPPINGS FOR RANDOM ACCESS OPERATIONS

(71) Applicant: Micron Technology, Inc., Boise, ID (US)

(72) Inventors: Wenjun Wu, Shanghai (CN); Huachen Li, Shanghai (CN); Xiaolai Zhu, Shanghai (CN); Ling Shi, Shanghai (CN); Qingyuan Wang, Shanghai (CN)

(73) Assignee: Micron Technology, Inc., Bosie, ID (US)

( * ) Notice: Subject to any disclaimer, the term of this patent is extended or adjusted under 35 U.S.C. 154(b) by 0 days.

(21) Appl. No.: 18/511,814

(22) Filed: Nov. 16, 2023

(65) Prior Publication Data

US 2024/0201860 A1     Jun. 20, 2024

Related U.S. Application Data

(60) Provisional application No. 63/433,266, filed on Dec. 16, 2022.

(51) Int. Cl.
*G06F 3/06* (2006.01)
*G06F 12/1009* (2016.01)

(52) U.S. Cl.
CPC .......... *G06F 3/0613* (2013.01); *G06F 3/0656* (2013.01); *G06F 3/0679* (2013.01); *G06F 12/1009* (2013.01)

(58) Field of Classification Search
CPC .... G06F 3/0613; G06F 3/0656; G06F 3/0679; G06F 12/1009; G06F 2212/7201; G06F 2212/1016; G06F 3/061; G06F 2212/7203; G06F 12/0246
See application file for complete search history.

(56) References Cited

U.S. PATENT DOCUMENTS

| | | | | |
|---|---|---|---|---|
| 8,819,367 | B1 * | 8/2014 | Fallone | G06F 11/1456 |
| | | | | 711/162 |
| 9,218,279 | B2 * | 12/2015 | Tomlin | G06F 12/1081 |
| 2002/0065989 | A1 * | 5/2002 | Chauvel | G06F 12/1027 |
| | | | | 711/138 |
| 2007/0180157 | A1 * | 8/2007 | Irish | G06F 12/0855 |
| | | | | 710/5 |
| 2019/0340134 | A1 * | 11/2019 | Haswell | G06F 12/0246 |

(Continued)

OTHER PUBLICATIONS

K. Han, H. Kim and D. Shin, "WAL-SSD: Address Remapping-Based Write-Ahead-Logging Solid-State Disks,", Feb. 1, 2020, in IEEE Transactions on Computers, vol. 69, No. 2, pp. 260-273 (Year: 2020).*

(Continued)

*Primary Examiner* — Ryan Bertram
(74) *Attorney, Agent, or Firm* — Holland & Hart LLP

(57) ABSTRACT

Methods, systems, and devices for address mappings for random access operations are described. A portion of a L2P table may be loaded (e.g., to a buffer) upon receiving a write command (e.g., a random write command). In some instances, one or more entries (e.g., one or more mappings) included in the portion of the L2P table may be updated based on the write command. The portion of the L2P table may be maintained in the buffer during subsequent access operations, such as random read operations. The subsequent access operations may utilize the portion of the L2P table to access a memory device.

18 Claims, 6 Drawing Sheets

(56) References Cited

U.S. PATENT DOCUMENTS

| | | | |
|---|---|---|---|
| 2020/0218646 A1* | 7/2020 | Li | G06F 13/28 |
| 2021/0096984 A1* | 4/2021 | Luo | G06F 13/1668 |
| 2021/0173786 A1* | 6/2021 | Muthiah | G06F 12/1009 |
| 2021/0200447 A1* | 7/2021 | Gupta | G06F 3/0679 |
| 2022/0114087 A1* | 4/2022 | Kim | G06F 13/1673 |
| 2022/0229789 A1* | 7/2022 | Balakrishnan | G06F 13/4282 |
| 2025/0086105 A1* | 3/2025 | Park | G06F 12/0891 |

OTHER PUBLICATIONS

Richter, Detlev; "Flash Memories: Economic Principles of Performance, Cost and Reliability Optimization", 2014, Springer, vol. 40, p. 35 (Year: 2014).*

* cited by examiner

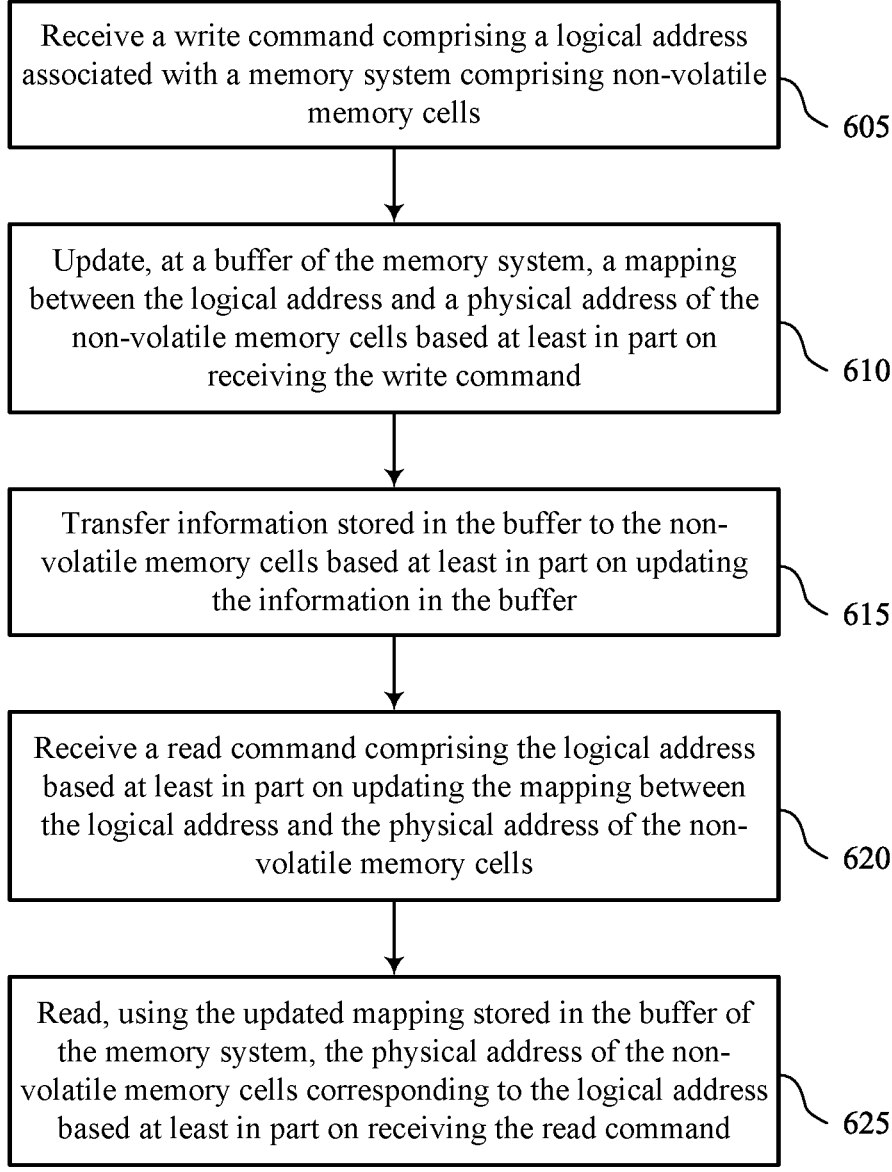

Receive a write command comprising a logical address associated with a memory system comprising non-volatile memory cells

605

Update, at a buffer of the memory system, a mapping between the logical address and a physical address of the non-volatile memory cells based at least in part on receiving the write command

610

Transfer information stored in the buffer to the non-volatile memory cells based at least in part on updating the information in the buffer

615

Receive a read command comprising the logical address based at least in part on updating the mapping between the logical address and the physical address of the non-volatile memory cells

620

Read, using the updated mapping stored in the buffer of the memory system, the physical address of the non-volatile memory cells corresponding to the logical address based at least in part on receiving the read command

ADDRESS MAPPINGS FOR RANDOM ACCESS OPERATIONS

CROSS REFERENCE

The present Application for patent claims the benefit of U.S. Provisional Patent Application No. 63/433,266 by W U et al., entitled "ADDRESS MAPPINGS FOR RANDOM ACCESS OPERATIONS," filed Dec. 16, 2022, which is assigned to the assignee hereof, and which is expressly incorporated by reference herein.

FIELD OF TECHNOLOGY

The following relates to one or more systems for memory, including address mappings for random access operations.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

BRIEF DESCRIPTION OF THE DRAWINGS

FIG. 6 shows a flowchart illustrating a method or methods that support address mappings for random access operations in accordance with examples as disclosed herein.

DETAILED DESCRIPTION

Figure 1:
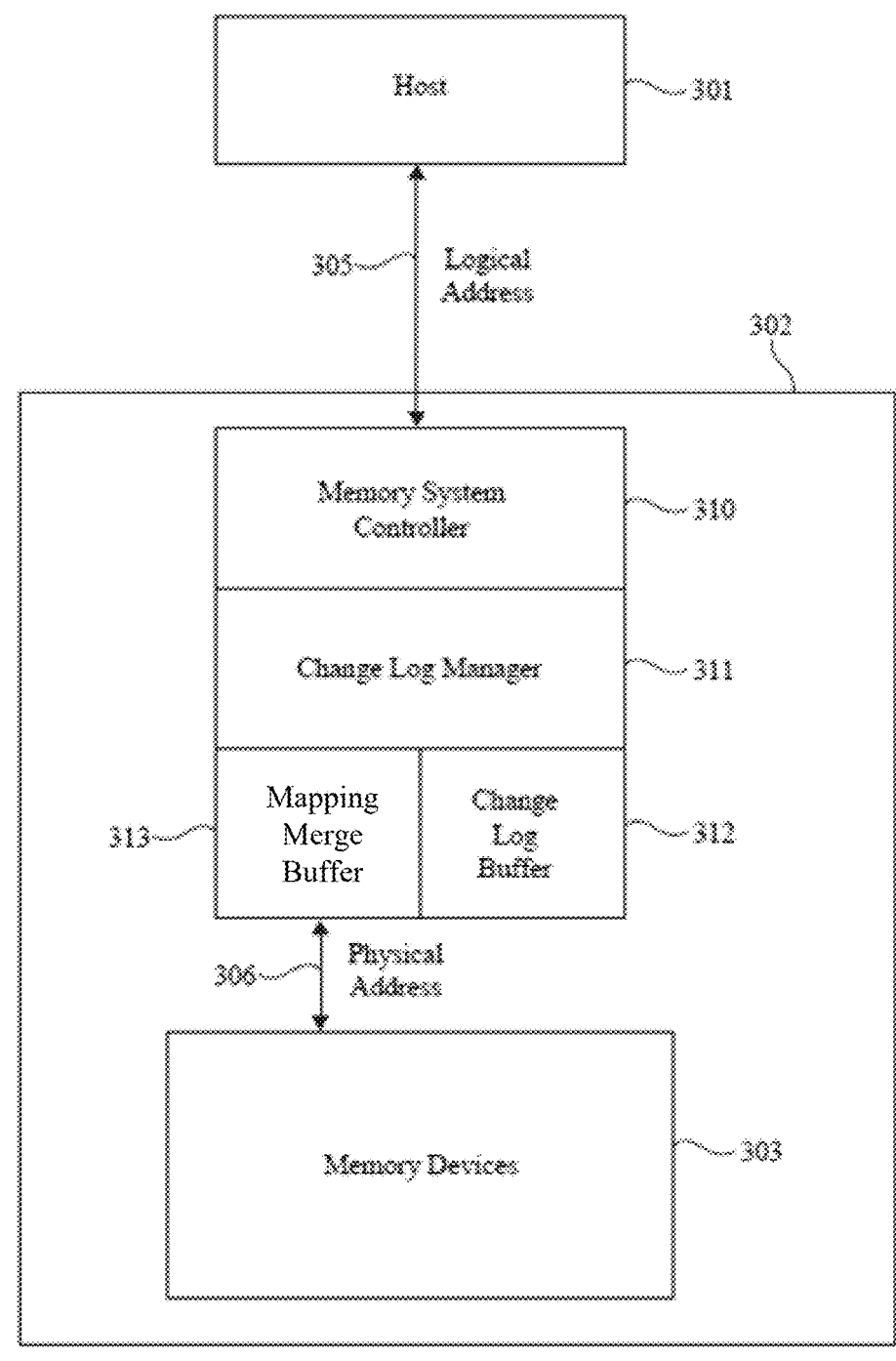
FIG. 1 illustrates an example of a system that supports address mappings for random access operations in accordance with examples as disclosed herein.

Methods, systems, and devices for address mappings for random access operations are described. Non-volatile memory devices (e.g., not-and (NAND) memory devices) may utilize a mapping of logical addresses used by a host system, and physical addresses of a memory device, to perform read and write operations. The logical addresses may be mapped to physical addresses of the non-volatile memory device, which may allow the non-volatile memory device to access (e.g., write) data to respective physical addresses. A memory system may utilize a memory mapping table (e.g., a logical-to-physical (L2P) table) to store a current version of the mappings between the logical addresses and the physical addresses.

The memory system may store a portion of the L2P table to a cache (e.g., a cache memory) to improve the speed of the lookup (e.g., the speed of determining the physical address using the logical address). The contents of cache may be loaded from one or more non-volatile memory devices when an access command is received. Loading the L2P table to the cache may delay the performance of the access operation as the mapping data is needed by the memory controller to perform the access operation. Eliminating the loading of the L2P table (or portions of the L2P table) to the cache for some access operations may improve the overall performance of the memory system.

Some access operations, such as random write operations, may result in a portion of an L2P table being updated. For example, a mapping between logical addresses and physical addresses of a memory device may be updated during a random write operation. In some examples, a portion of the L2P table may be maintained within the cache and another portion of the mapping (e.g., the remaining portion of the L2P table) may be stored to memory locations in the non-volatile memory devices. The write operations may cause the contents of the cache to be updated, as the write operation may change the physical address used to store the data corresponding to a logical address. The update to the L2P table may occur within the cache, and the updated mapping may be transmitted (e.g., flushed) to the non-volatile memory device.

The L2P table stored to the non-volatile memory device may be updated using the updated portion of the L2P table flushed to the non-volatile memory device. When a subsequent access operation (e.g., a subsequent random read operation) is requested, the cache may be loaded with a portion of the L2P table, which may delay the subsequent memory operations. This delay may impact the performance of the memory system. For example, the loading may add additional latency to the random read operation, which may negatively affect the memory system's performance.

Accordingly, implementations described herein address the aforementioned shortcomings and other shortcomings by providing a buffer (e.g., a mapping merge buffer) configured to store a portion of an L2P table for a duration of time. When a random read operation follows a random write operation, the portion of the L2P table may be maintained in the mapping merge buffer (e.g., as opposed to being flushed to the non-volatile memory). Thus the mapping merge buffer may not need to load a portion of the L2P table to perform the random read operation. As such, the mapping merge buffer may contain mapping data that may be utilized for the random read operations. By eliminating the loading of one or more portions of an L2P table to the mapping merge buffer, the time needed to perform the subsequent random read operations may be decreased, which may increase the overall performance of the memory system.

In addition to applicability in memory systems as described herein, techniques for address mappings for random access operations may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by reducing the time needed to perform subsequent random read operations, which may increase the overall performance of the memory system, among other benefits.

Figure 2:
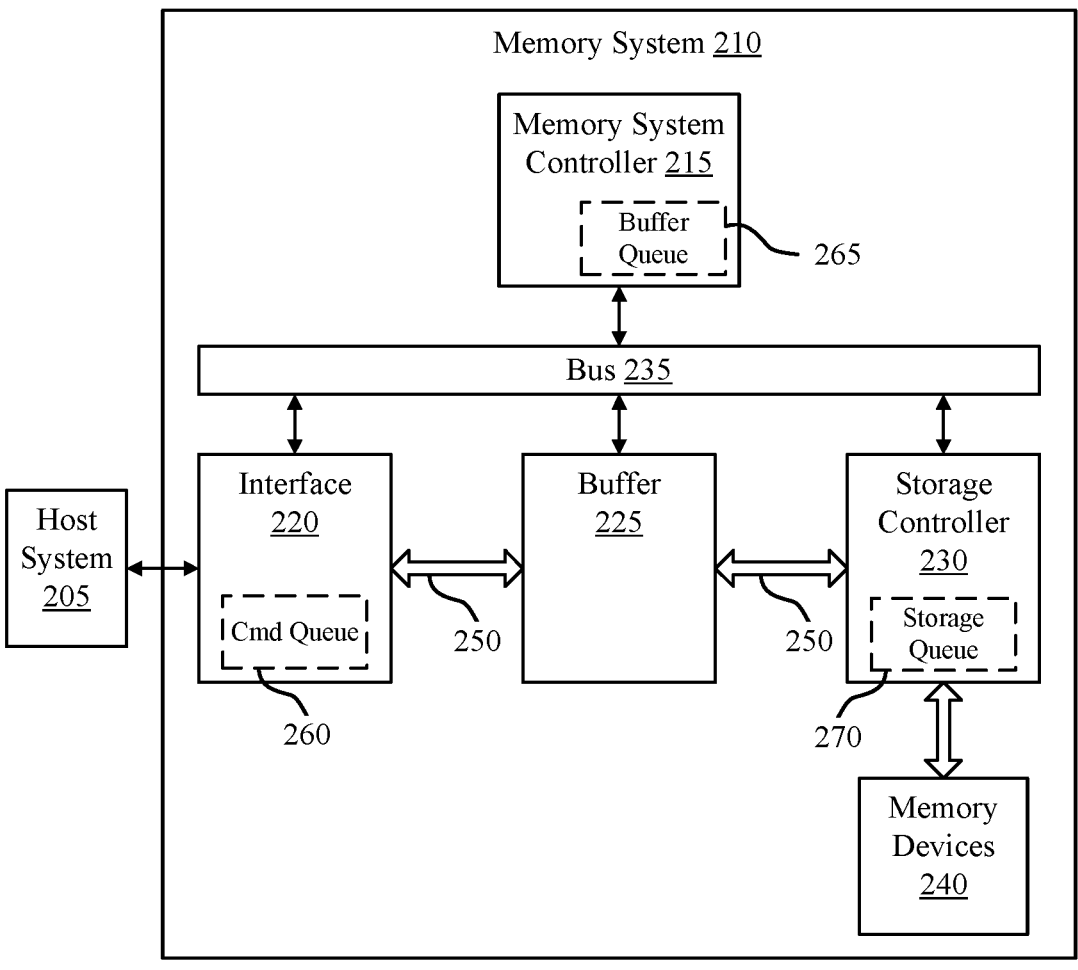
FIG. 2 illustrates an example of a system that supports address mappings for random access operations in accordance with examples as disclosed herein.

Features of the disclosure are initially described in the context of systems, devices, and circuits with reference to FIGS. 1 through 2. Features of the disclosure are described in the context systems and memory devices with reference to FIGS. 3 and 4. These and other features of the disclosure are further illustrated by and described in the context of an apparatus diagram and flowchart that relate to address mappings for random access operations with reference to FIGS. 5 and 6.

FIG. 1 illustrates an example of a system 100 that supports address mappings for random access operations in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IOT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory array's of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application-specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide-based RRAM (OxRAM), electrically erasable programmable ROM (EE-PROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single-level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide a greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be rewritten with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new; valid block 170 rather than the old, invalid block 170. In some cases, such copying and remapping may be performed instead of erasing and rewriting the entire old block 170 due to latency or wear out considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained, and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contains valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory array's and related circuitry combined with a local (e.g., on-die or in-package) controller (e.g., local controller 135). An example of a managed memory system is a managed NAND (MNAND) system.

The system 100 may include any quantity of non-transitory computer-readable media that support address mappings for random access operations. For example, the host system 105 (e.g., a host system controller 106), the memory system 110 (e.g., a memory system controller 115), or a memory device 130 (e.g., a local controller 135) may include or otherwise may access one or more non-transitory computer-readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The memory system 110 may utilize an L2P table to perform read and write operations. The logical addresses may be mapped to physical addresses used within the non-volatile memory devices 130, which may allow for data to be written to or read from the non-volatile memory devices. In some examples, the memory system 110 may utilize a buffer (e.g., a mapping merge buffer: not shown) to store portions of an L2P table during one or more access operations.

For example, during a write operation (e.g., a random write operation), a portion of an L2P table may be loaded to the mapping merge buffer from the memory device 130. In some instances, one or more portions (e.g., one or more mappings) included in the portion of the L2P table may be updated during the write operation. When a subsequent random read operation is requested, the portion of the L2P table may be maintained in the mapping merge buffer (e.g., as opposed to being flushed to the memory device 130). Thus the mapping merge buffer may not need to load a portion of the L2P table to perform the random read operation. As such, the mapping merge buffer may contain mapping data that may be utilized for the random read operations. By eliminating the loading of one or more portions of an L2P table to the mapping merge buffer, the time needed to perform the subsequent random read operations may be decreased, which may increase the overall performance of the memory system 110.

FIG. 2 illustrates an example of a system 200 that supports address mappings for random access operations in accordance with examples as disclosed herein. The system 200 may be an example of a system 100 as described with reference to FIG. 1, or aspects thereof. The system 200 may include a memory system 210 configured to store data received from the host system 205 and to send data to the host system 205 if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240) directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230) (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path-switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270) may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

Once the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs, and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

The memory system 210 may utilize an L2P table to perform read and write operations. The logical addresses may be mapped to physical addresses used within the non-volatile memory devices 240, which may allow for data to be written to or read from the non-volatile memory devices. In some examples, the memory system 210 may utilize a buffer (e.g., a mapping merge buffer: not shown) to store portions of an L2P table during one or more access operations.

For example, during a write operation (e.g., a random write operation), a portion of an L2P table may be loaded to the mapping merge buffer from the memory device 240. In some instances, one or more portions (e.g., one or more mappings) included in the portion of the L2P table may be updated during the write operation. When a subsequent random read operation is requested, the portion of the L2P table may be maintained in the mapping merge buffer (e.g., as opposed to being flushed to the memory device 240). Thus the mapping merge buffer may not need to load a portion of the L2P table to perform the random read operation. As such, the mapping merge buffer may contain mapping data that may be utilized for the random read operations. By eliminating the loading of one or more portions of an L2P table to the mapping merge buffer, the time needed to perform the subsequent random read operations may be decreased, which may increase the overall performance of the memory system 210.

Figure 3:
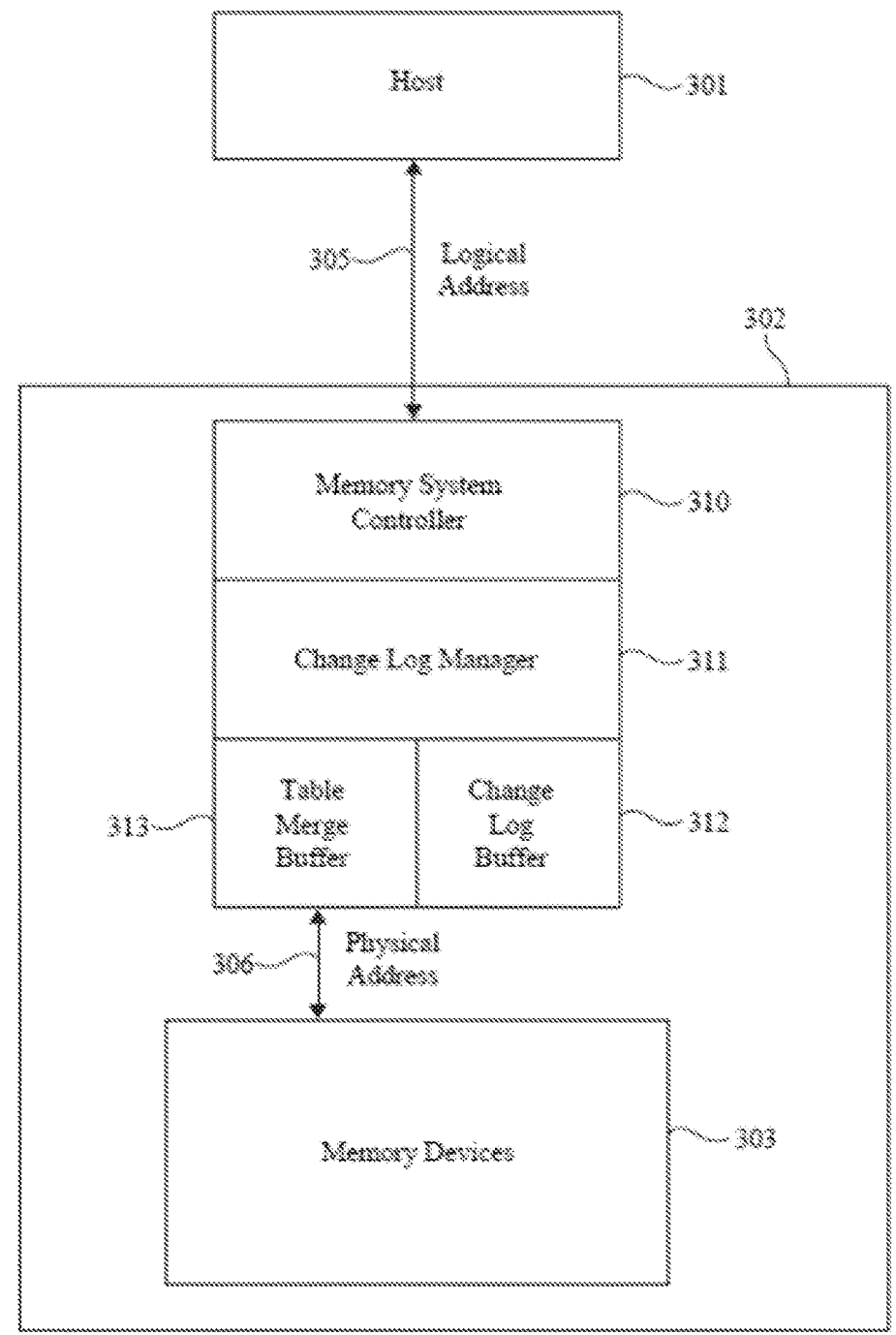
FIG. 3 illustrates an example of a system that supports address mappings for random access operations in accordance with examples as disclosed herein.

FIG. 3 illustrates an example of a system 300 that supports address mappings for random access operations in accordance with examples as disclosed herein. System 300 illustrates a host system 301 coupled with a memory system 302 that includes a memory system controller 310. In some examples, the memory system controller 310 may maintain aspects of an L2P table used to access data within the memory devices 303. The memory system 302 may include a change log manager 311, a buffer 313 (e.g., a mapping merge buffer 313), and a change log buffer 312. In some examples, a portion of an L2P table may be stored (e.g., maintained) in the mapping merge buffer 313 during one or more access operations, which may increase the overall performance of the memory system 302.

In the system 300 illustrated in FIG. 3, various components may correspond to similar components described in referent to FIGS. 1 and 2. For example, the memory device 303 could be an example of the memory device 130-*a* or 130-*b* as described with reference to FIG. 1. Similarly, the memory system controller 310 could be an example of the memory system controller 115 as also described with reference to FIG. 1.

In some examples, the memory system controller 310 may receive commands (e.g., access command) from the host system 301 and may perform operations (e.g., access operations) on the memory devices 303. For example, the memory system controller 310 may perform random access operations (e.g., random read operations: random write operations), which may include reading data from or writing data to non-sequential addresses of the memory devices 303. Additionally or alternatively, the memory system controller 310 may communicate with the change log manager 311, the change log buffer 312, and the mapping merge buffer 313 to maintain and update aspects of a L2P table. In some instances, the change log manager 311 may be integrated within the memory system controller 310 or may be a separate physical processor that implements the functions performed by the change log manager 311.

The change log buffer 312 and the mapping merge buffer 313 may utilized to update and maintain aspects of a L2P table that is used to perform access operations on the memory devices 303. For example, each the change log buffer 312 and the mapping merge buffer 313 may include one or more volatile memory cells, such as SRAM cells, used to update and maintain aspects of the L2P table. In some instances, the portion of the L2P table may be stored to the mapping merge buffer 313, and aspects of the L2P table may be updated using the change log buffer 312. Additionally or alternatively, the change log manager 311 may track which portions of the L2P table (e.g., which logical addresses or which logical address ranges) are stored to the mapping merge buffer 313. Accordingly, when an access command is received the change log manager 311 may either facilitate the access operation using the portion of the L2P table stored to the mapping merge buffer 313, or may facilitate loading a relevant portion of the L2P table from the memory devices 303 (e.g., to the mapping merge buffer 313).

For example, when a write command is received from the host system 301, an entry may be added to the change log buffer 312, which may result in the portion of the L2P stored to the mapping merge buffer 313 being updated. The memory system controller 310 may load the portion of the L2P table (e.g., from the memory devices 303) to the mapping merge buffer 313 upon receiving an access command. This data may utilized by the memory system controller 310 to perform the logical-to-physical address translations for each read and write operation.

When the memory system controller 310 performs a write operation, the memory system controller 310 may read data from the memory devices 303, modify the data as required by the write operation, and return (e.g., write) the modified data to the memory devices 303. For example, when a write operation is performed, the memory system may receive a write command that includes a logical address. The memory system controller 310 may write the data to one or more physical addresses (e.g., one or more non-sequential physical addresses) of the memory devices 303 and may update the portion of the L2P stored to the mapping merge buffer 313 to reflect the mapping.

In some instances, the memory system controller 310 may update the portion of the L2P table by creating an entry in the change log buffer 312 that reflects the updated mapping. The entry may contain data that indicates the changes to be made in the portion of the L2P table stored to the mapping merge buffer 313. For example, an entry may be written to the change log buffer 312 that associates the received logical address with the physical address that the data was written to. Accordingly, during a duration (e.g., an idle duration: a duration when the memory system 302 has bandwidth to update the L2P table), the portion of the L2P table stored to the mapping merge buffer 313 may be updated. In some instances, an indication of the updated mapping may be provided to the change log manager 311.

The change log manager 311 may periodically use the entries stored to the change log buffer 312 to update the portion of the L2P table stored to the mapping merge buffer 313. Additionally or alternatively, the updated portion of the L2P table stored to the mapping merge buffer 313 may be used to update the L2P table stored to the memory devices 303. That is, because the L2P table stored to the memory devices 303 may be too large to be loaded to the mapping merge buffer 313, only a portion may be loaded at a time and may be periodically updated based on changes made to the portion stored to the mapping merge buffer 313. The change log manager 311 may update the L2P table stored to the memory devices 303 at various points in time, such as when the memory system controller 310 is otherwise idle, when the change log buffer 312 is full, or when the portion of the L2P table is removed from the mapping merge buffer 313 in order to load a different portion of the L2P table.

During operation, the memory system controller 310 may receive access commands (e.g., random read commands, random write commands) from the host system 105. As described herein, a random access operation may read data from or write data to non-sequential addresses of the memory devices 303. In some instances, random write operations may commonly be followed by random read operations. Accordingly, the portion of the L2P table that is loaded (and updated) during a random write operation, may be maintained in the mapping merge buffer 313 for a subsequent random read operation (or other type of access operation). By maintaining the portion of the L2P table in the mapping merge buffer 313, the memory system controller 310 (or other component of the memory system 302) may not need to load additional portions of the L2P table (e.g., from the memory devices 303) for the random read operation. Accordingly, latency that would otherwise occur due to the loading process may be mitigated, which may improve the overall performance of the memory system 302.

Figure 4:
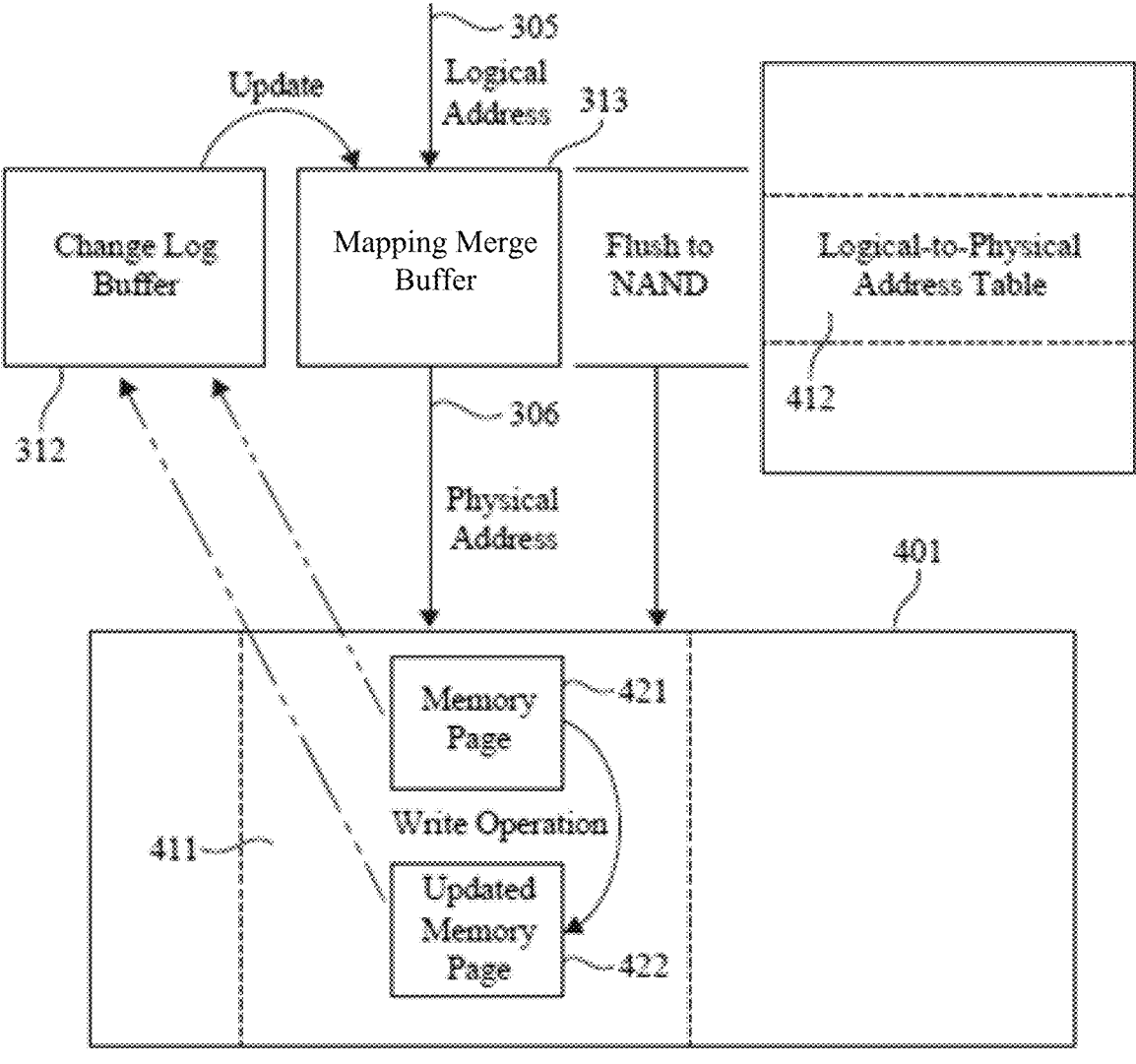
FIG. 4 illustrates an example of a memory system that supports address mappings for random access operations in accordance with examples as disclosed herein.

FIG. 4 illustrates an example of a memory device 400 that support address mappings for random access operations in accordance with examples as disclosed herein. In some examples, the memory device 400 may illustrate operations performed at or by the change log buffer, mapping merge buffer, and memory device, among other components, as described with reference to FIG. 3. In some examples, a portion of an L2P table may be stored (e.g., maintained) in the mapping merge buffer 313 during one or more access operations, which may increase the overall performance of the memory device 400.

In some examples, a memory device 401 may maintain a L2P table that is used to facilitate access operations. For example, the memory device 401 may maintain the L2P table in a portion 411 of storage (e.g., in a portion 411 of one or more memory arrays). As described herein, the L2P table may be too large to be loaded to the mapping merge buffer 313, thus only a portion 412 of the L2P table may be loaded to the mapping merge buffer 313 at a given time. When an access command (e.g., a random write command) is received, the portion 412 of the L2P table may be loaded to the mapping merge buffer 313. The portion may include a logical address (or a range of logical addresses) included in the received command.

The memory system controller may use the portion 412 of the L2P table to translate the received logical address(es) 305 into physical addresses 306 of the memory device 401. As such, the portion 412 of the L2P table may be loaded to the mapping merge buffer 313 when an access command is received. For example, the memory system controller may receive a random write command and may load a portion 412 of the L2P table to the mapping merge buffer 313 accordingly. The portion loaded may include a logical address, or a range of logical addresses, associated with the random write command.

In response to receiving the write, the memory system controller may read data from the memory device 401, modify the data as required by the write operation, and return (e.g., write) the modified data to the memory device 401. For example, when a write operation is performed, the memory system may receive a write command that includes a logical address. The memory system controller may write the data to one or more physical addresses (e.g., one or more non-sequential physical addresses) of the memory device 401 and may store an entry to the change log buffer 312 to update the portion 412 of the L2P stored to the mapping merge buffer 313. By way of example, upon receiving a write command, the memory system controller may write data to the updated memory page 422 and may store an entry to the change log buffer 312. The entry may indicate that a mapping between a logical address 305 and a physical address of the memory page 421 is to be updated to be between the logical address 305 and the physical address of the updated memory page 422.

The portion 412 of the L2P table stored to the mapping merge buffer 313 may be updated based on the indication stored to the change log buffer 312. For example, an entry in the change log buffer 312 may contain a logical address, a prior physical address corresponding the logical address, and an updated physical address to be used upon completion of the write operation. Accordingly, during a subsequent duration (e.g., during an idle duration), the portion 412 of the L2P table may be updated.

In some instances, each time data is written to the memory device 401, an entry may be added to the change log buffer 312. In some examples, when an entry is added to the change log buffer 312, an additional portion of the L2P table may be loaded (e.g., loaded to the mapping merge buffer 313) from the memory device 401. For example, if the entry in the change log buffer 312 is not associated with a portion 412 of the L2P table, then an additional portion may be loaded from the memory device 401.

Additionally or alternatively, when the portion 412 of the L2P table is updated, the portion 412 may be flushed to the memory device 401. As used herein, "flushing" may refer to providing the portion 412 of the L2P table to the memory device 401, so that the L2P table stored to the memory device 401 can be updated. The portion 412 of the L2P table may remain in the mapping merge buffer 313 after being flushed. In other instances, flushing the portion 412 of the L2P table to the memory device 401 may remove the portion 412 from the mapping merge buffer 313. In such instances, the portion 412 may be flushed upon the occurrence of a subsequent random read operation (or any other subsequent operation that the portion 412 is used for).

As described herein, random read operations often follow random write operations. Accordingly, the portion 412 of the L2P table may be maintained in the mapping merge buffer 313 for a duration that encompasses at least one subsequent operation. For example, the duration could encompass at least one random read operation, or at least one operation of a different type.

Because a random read operation often includes a same range of logical addresses as a random write operation, the portion 412 of the L2P table may be utilized for the random read operation. That is, the memory system controller may not need to load a portion of the L2P table to the mapping merge buffer 313 for the random read command. Thus, instead of reloading a portion of the L2P table, the memory system controller may utilize applicable portions of the loaded L2P table to perform the access operation. By maintaining the portion 412 of the L2P table in the mapping merge buffer 313, the memory system controller (or other component of the memory system) may not need to load additional portions of the L2P table (e.g., from the memory device 401) for the random read operation. Accordingly, latency that would otherwise occur due to the loading process may be mitigated, which may improve the overall performance of the memory system.

Figure 5:
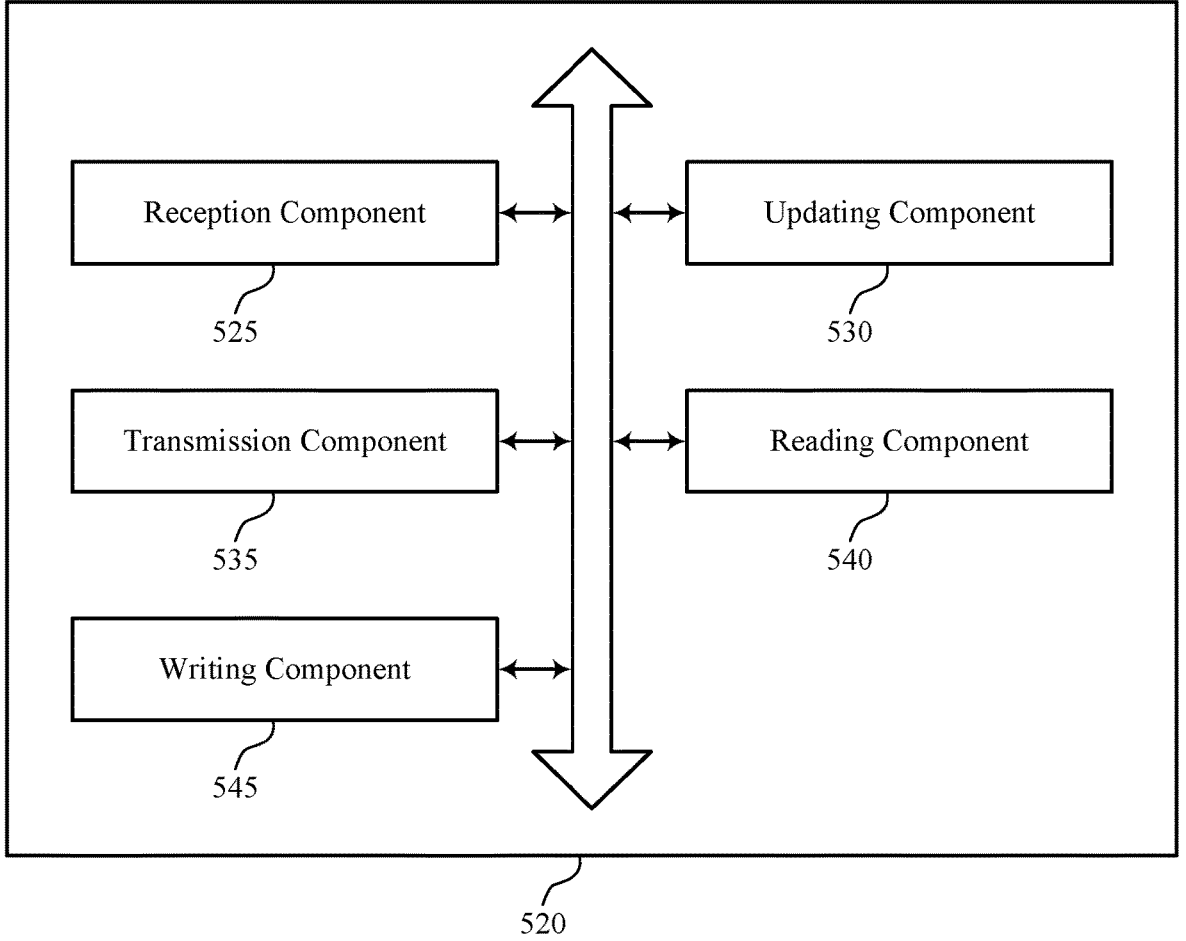
FIG. 5 shows a block diagram of a memory system that supports address mappings for random access operations in accordance with examples as disclosed herein.

FIG. 5 shows a block diagram 500 of a memory system 520 that supports address mappings for random access operations in accordance with examples as disclosed herein. The memory system 520 may be an example of aspects of a memory system as described with reference to FIGS. 1 through 4. The memory system 520, or various components thereof, may be an example of means for performing various aspects of address mappings for random access operations as described herein. For example, the memory system 520 may include a reception component 525, an updating component 530, a transmission component 535, a reading component 540, a writing component 545, or any combination thereof. Each of these components may communicate, directly or indirectly, with one another (e.g., via one or more buses).

The reception component 525 may be configured as or otherwise support a means for receiving a write command including a logical address associated with a memory system including non-volatile memory cells. The updating component 530 may be configured as or otherwise support a means for updating, at a buffer of the memory system, a mapping between the logical address and a physical address of the non-volatile memory cells based at least in part on receiving the write command. The transmission component 535 may be configured as or otherwise support a means for transferring information stored in the buffer to the non-volatile memory cells based at least in part on updating the information in the buffer. In some examples, the reception component 525 may be configured as or otherwise support a means for receiving a read command including the logical address based at least in part on updating the mapping between the logical address and the physical address of the non-volatile memory cells. The reading component 540 may be configured as or otherwise support a means for reading, using the updated mapping stored in the buffer of the memory system, the physical address of the non-volatile memory cells corresponding to the logical address based at least in part on receiving the read command.

In some examples, the updating component 530 may be configured as or otherwise support a means for maintaining the updated mapping in the buffer of the memory system for a duration, where reading the physical address of the non-volatile memory cells corresponding to the logical address occurs during the duration.

In some examples, the transmission component 535 may be configured as or otherwise support a means for transmitting an indication of the updated mapping from the buffer of the memory system to the non-volatile memory cells during the duration.

In some examples, the updating component 530 may be configured as or otherwise support a means for loading the mapping to the buffer of the memory system based at least in part on receiving the write command, where updating the mapping between the logical address and the physical address is based at least in part on loading the mapping to the buffer.

In some examples, the reception component 525 may be configured as or otherwise support a means for receiving a second write command including a plurality of logical addresses associated with the memory system. In some examples, the updating component 530 may be configured as or otherwise support a means for updating, at the buffer of the memory system, mappings between each logical address of the plurality of logical addresses and a corresponding physical address of the non-volatile memory cells based at least in part on receiving the second write command. In some examples, the reception component 525 may be configured as or otherwise support a means for receiving a second read command including a subset of the plurality of logical addresses based at least in part on updating the mappings between each logical address of the plurality of logical addresses and the corresponding physical address of the non-volatile memory cells. In some examples, the reading component 540 may be configured as or otherwise support a means for reading, using the updated mappings at the buffer of the memory system, physical addresses of the non-volatile memory cells corresponding to the subset of the plurality of logical addresses based at least in part on receiving the second read command.

In some examples, the updating component 530 may be configured as or otherwise support a means for maintaining the updated mappings between each logical address of the plurality of logical addresses and the corresponding physical address of the non-volatile memory cells in the buffer of the memory system for a second duration, where reading the physical addresses of the non-volatile memory cells corresponding to the subset of the plurality of logical addresses occurs during the second duration.

In some examples, the writing component 545 may be configured as or otherwise support a means for writing the updated mappings at the buffer of the memory system to the non-volatile memory cells after completing an operation associated with the write command.

In some examples, the duration extends beyond the writing of the updated mappings at the buffer of the memory system to the non-volatile memory cells.

In some examples, the second duration extends beyond the writing of the updated mappings at the buffer of the memory system to the non-volatile memory cells.

In some examples, the writing component 545 may be configured as or otherwise support a means for writing data to the physical address of the non-volatile memory cells based at least in part on receiving the write command.

In some examples, the write command includes a random write command. In some examples, the read command includes a random read command.

In some examples, the buffer contains the mapping between the logical address and the physical address for an address space in use by a host process issuing random write commands and random read commands.

In some examples, the updating component 530 may be configured as or otherwise support a means for updating a change-log of changes to the mapping based at least in part on receiving the write command, where updating the mapping is based at least in part on updating the change-log.

In some examples, the transmission component 535 may be configured as or otherwise support a means for transferring a portion of the mapping from the non-volatile memory cells to the buffer based at least in part on updating a change-log, where updating the mapping is based at least in part on transferring the portion of the mapping and on one or more entries in the change-log.

In some examples, the buffer includes a mapping merge buffer.

In some examples, the writing component 545 may be configured as or otherwise support a means for writing the updated mappings at the buffer of the memory system to the non-volatile memory cells after completing an operation associated with the write command.

FIG. 6 shows a flowchart illustrating a method 600 that supports address mappings for random access operations in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include receiving a write command including a logical address associated with a memory system including non-volatile memory cells. The operations of 605 may be performed in accordance with examples as disclosed herein. In some examples, aspects of the operations of 605 may be performed by a reception component 525 as described with reference to FIG. 5.

At 610, the method may include updating, at a buffer of the memory system, a mapping between the logical address and a physical address of the non-volatile memory cells based at least in part on receiving the write command. The operations of 610 may be performed in accordance with examples as disclosed herein. In some examples, aspects of the operations of 610 may be performed by an updating component 530 as described with reference to FIG. 5.

At 615, the method may include transferring information stored in the buffer to the non-volatile memory cells based at least in part on updating the information in the buffer. The operations of 615 may be performed in accordance with examples as disclosed herein. In some examples, aspects of the operations of 615 may be performed by a transmission component 535 as described with reference to FIG. 5.

At 620, the method may include receiving a read command including the logical address based at least in part on updating the mapping between the logical address and the physical address of the non-volatile memory cells. The operations of 620 may be performed in accordance with examples as disclosed herein. In some examples, aspects of the operations of 620 may be performed by a reception component 525 as described with reference to FIG. 5.

At 625, the method may include reading, using the updated mapping stored in the buffer of the memory system, the physical address of the non-volatile memory cells corresponding to the logical address based at least in part on receiving the read command. The operations of 625 may be performed in accordance with examples as disclosed herein. In some examples, aspects of the operations of 625 may be performed by a reading component 540 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a write command including a logical address associated with a memory system including non-volatile memory cells: updating, at a buffer of the memory system, a mapping between the logical address and a physical address of the non-volatile memory cells based at least in part on receiving the write command: transferring information stored in the buffer to the non-volatile memory cells based at least in part on updating the information in the buffer: receiving a read command including the logical address based at least in part on updating the mapping between the logical address and the physical address of the non-volatile memory cells; and reading, using the updated mapping stored in the buffer of the memory system, the physical address of the non-volatile memory cells corresponding to the logical address based at least in part on receiving the read command.

Aspect 2: The method, apparatus, or non-transitory computer-readable medium of aspect 1, further including operations, features, circuitry, logic, means, or instructions, or any combination thereof for maintaining the updated mapping in the buffer of the memory system for a duration, where reading the physical address of the non-volatile memory cells corresponding to the logical address occurs during the duration.

Aspect 3: The method, apparatus, or non-transitory computer-readable medium of aspect 2, further including operations, features, circuitry, logic, means, or instructions, or any combination thereof for transmitting an indication of the updated mapping from the buffer of the memory system to the non-volatile memory cells during the duration.

Aspect 4: The method, apparatus, or non-transitory computer-readable medium of any of aspects 1 through 3, further including operations, features, circuitry, logic, means, or instructions, or any combination thereof for loading the mapping to the buffer of the memory system based at least in part on receiving the write command, where updating the mapping between the logical address and the physical address is based at least in part on loading the mapping to the buffer.

Aspect 5: The method, apparatus, or non-transitory computer-readable medium of any of aspects 1 through 4, further including operations, features, circuitry, logic, means, or instructions, or any combination thereof for receiving a second write command including a plurality of logical addresses associated with the memory system: updating, at the buffer of the memory system, mappings between each logical address of the plurality of logical addresses and a corresponding physical address of the non-volatile memory cells based at least in part on receiving the second write command: receiving a second read command including a subset of the plurality of logical addresses based at least in part on updating the mappings between each logical address of the plurality of logical addresses and the corresponding physical address of the non-volatile memory cells; and reading, using the updated mappings at the buffer of the memory system, physical addresses of the non-volatile memory cells corresponding to the subset of the plurality of logical addresses based at least in part on receiving the second read command.

Aspect 6: The method, apparatus, or non-transitory computer-readable medium of aspect 5, further including operations, features, circuitry, logic, means, or instructions, or any combination thereof for maintaining the updated mappings between each logical address of the plurality of logical addresses and the corresponding physical address of the non-volatile memory cells in the buffer of the memory system for a second duration, where reading the physical addresses of the non-volatile memory cells corresponding to the subset of the plurality of logical addresses occurs during the second duration.

Aspect 7: The method, apparatus, or non-transitory computer-readable medium of aspect 6, further including operations, features, circuitry, logic, means, or instructions, or any combination thereof for writing the updated mappings at the buffer of the memory system to the non-volatile memory cells after completing an operation associated with the write command.

Aspect 8: The method, apparatus, or non-transitory computer-readable medium of aspect 7, where the duration extends beyond the writing the updated mappings at the buffer of the memory system to the non-volatile memory cells.

Aspect 9: The method, apparatus, or non-transitory computer-readable medium of any of aspects 7 through 8, where the second duration extends beyond the writing the updated mappings at the buffer of the memory system to the non-volatile memory cells.

Aspect 10: The method, apparatus, or non-transitory computer-readable medium of any of aspects 1 through 9, further including operations, features, circuitry, logic, means, or instructions, or any combination thereof for writing data to the physical address of the non-volatile memory cells based at least in part on receiving the write command.

Aspect 11: The method, apparatus, or non-transitory computer-readable medium of any of aspects 1 through 10, where the write command includes a random write command and the read command includes a random read command.

Aspect 12: The method, apparatus, or non-transitory computer-readable medium of aspect 11, where the buffer contains the mapping between the logical address and the physical address for an address space in use by a host process issuing random write commands and random read commands.

Aspect 13: The method, apparatus, or non-transitory computer-readable medium of any of aspects 1 through 12, further including operations, features, circuitry, logic, means, or instructions, or any combination thereof for updating a change-log of changes to the mapping based at least in part on receiving the write command, where updating the mapping is based at least in part on updating the change-log.

Aspect 14: The method, apparatus, or non-transitory computer-readable medium of any of aspects 1 through 13, further including operations, features, circuitry, logic, means, or instructions, or any combination thereof for transferring a portion of the mapping from the non-volatile memory cells to the buffer based at least in part on updating a change-log, where updating the mapping is based at least in part on transferring the portion of the mapping and on one or more entries in the change-log.

Aspect 15: The method, apparatus, or non-transitory computer-readable medium of any of aspects 1 through 14, where the buffer includes a mapping merge buffer.

Aspect 16: The method, apparatus, or non-transitory computer-readable medium of any of aspects 1 through 15, further including operations, features, circuitry, logic, means, or instructions, or any combination thereof for writing the updated mappings at the buffer of the memory system to the non-volatile memory cells after completing an operation associated with the write command.

It should be noted that the described techniques include possible implementations and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal: however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow:

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and second condition or action may occur directly as a result of the previous condition or action occurring independently of whether other conditions or actions occur. In some examples, a first condition or action may be performed, and second condition or action may occur directly as a result of the previous condition or action occurring, such that no other intermediate conditions or actions occur between the earlier condition or action and the second condition or action, or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion implantation, or by any other doping means.

A switching component or a transistor discussed herein may represent a field-effect transistor (FET) and comprise a three-terminal device including a source, drain, and gate. The terminals may be connected to other electronic elements through conductive materials, e.g., metals. The source and drain may be conductive and may comprise a heavily doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority of carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general-purpose or special-purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:

a controller associated with a memory device, wherein the controller is configured to cause the apparatus to:

receive a write command comprising a logical address associated with one or more non-volatile memory cells;

update, at a buffer of the memory device, a mapping between the logical address and a physical address of the one or more non-volatile memory cells based at least in part on receiving the write command;

transfer information stored in the buffer to the one or more non-volatile memory cells based at least in part on updating the mapping in the buffer;

maintain the updated mapping in the buffer of the memory device for a duration based at least in part on the write command comprising a random write command and based at least in part on transferring the information stored in the buffer to the one or more non-volatile memory cells, wherein the duration is based at least in part on a duration for performing at least one subsequent operation;

receive a read command comprising the logical address based at least in part on updating the mapping between the logical address and the physical address of the one or more non-volatile memory cells;

read, during the duration and using the updated mapping stored in the buffer of the memory device, the physical address of the one or more non-volatile memory cells corresponding to the logical address based at least in part on receiving the read command; and remove the mapping from the buffer in accordance with expiration of the duration.

2. The apparatus of claim 1, wherein, to transfer the information, the controller is further configured to cause the apparatus to:

transmit an indication of the updated mapping from the buffer of the memory device to the one or more non-volatile memory cells during the duration.

3. The apparatus of claim 1, wherein the controller is further configured to cause the apparatus to:

load the mapping to the buffer of the memory device based at least in part on receiving the write command, wherein updating the mapping between the logical address and the physical address is based at least in part on loading the mapping to the buffer.

4. The apparatus of claim 1, wherein the controller is further configured to cause the apparatus to:

receive a second write command comprising a plurality of logical addresses associated with the memory device;

update, at the buffer of the memory device, mappings between each logical address of the plurality of logical addresses and a corresponding physical address of the one or more non-volatile memory cells based at least in part on receiving the second write command;

receive a second read command comprising a subset of the plurality of logical addresses based at least in part on updating the mappings between each logical address of the plurality of logical addresses and the corresponding physical address of the one or more non-volatile memory cells; and read, using the updated mappings at the buffer of the memory device, physical addresses of the one or more non-volatile memory cells corresponding to the subset of the plurality of logical addresses based at least in part on receiving the second read command.

5. The apparatus of claim 4, wherein the controller is further configured to cause the apparatus to:

maintain the updated mappings between each logical address of the plurality of logical addresses and the corresponding physical address of the one or more non-volatile memory cells in the buffer of the memory device for a second duration, wherein reading the physical addresses of the one or more non-volatile memory cells corresponding to the subset of the plurality of logical addresses occurs during the second duration.

6. The apparatus of claim 1, wherein the controller is further configured to cause the apparatus to:

write data to the physical address of the one or more non-volatile memory cells based at least in part on receiving the write command.

7. The apparatus of claim 1, wherein the read command comprises a random read command.

8. The apparatus of claim 1, wherein the controller is further configured to cause the apparatus to:

update a change-log of changes to the mapping based at least in part on receiving the write command, wherein updating the mapping is based at least in part on updating the change-log.

9. The apparatus of claim 8, wherein the controller is further configured to cause the apparatus to:

transfer a portion of the mapping from the one or more non-volatile memory cells to the buffer based at least in part on updating the change-log, wherein updating the mapping is based at least in part on transferring the portion of the mapping and on one or more entries in the change-log.

10. The apparatus of claim 1, wherein the buffer comprises a mapping merge buffer.

11. A non-transitory computer-readable medium storing code comprising instructions which, when executed by a processor of an electronic device, cause the electronic device to:

receive a write command comprising a logical address associated with a memory system comprising non-volatile memory cells;

update, at a buffer of the memory system, a mapping between the logical address and a physical address of the non-volatile memory cells based at least in part on receiving the write command;

transfer information stored in the buffer to the non-volatile memory cells based at least in part on updating the mapping in the buffer;

maintain the updated mapping in the buffer of the memory system for a duration based at least in part on the write command comprising a random write command and based at least in part on transferring the information stored in the buffer to the non-volatile memory cells, wherein the duration is based at least in part on a duration for performing at least one subsequent operation;

receive a read command comprising the logical address based at least in part on updating the mapping between the logical address and the physical address of the non-volatile memory cells;

read, during the duration and using the updated mapping stored in the buffer of the memory system, the physical address of the non-volatile memory cells corresponding to the logical address based at least in part on receiving the read command; and remove the mapping from the buffer in accordance with expiration of the duration.

12. The non-transitory computer-readable medium of claim 11, wherein the instructions, when executed by the processor of the electronic device, further cause the electronic device to:

transmit an indication of the updated mapping from the buffer of the memory system to the non-volatile memory cells during the duration.

13. The non-transitory computer-readable medium of claim 11, wherein the instructions, when executed by the processor of the electronic device, further cause the electronic device to:

load the mapping to the buffer of the memory system based at least in part on receiving the write command, wherein updating the mapping between the logical address and the physical address is based at least in part on loading the mapping to the buffer.

14. The non-transitory computer-readable medium of claim 11, wherein the instructions, when executed by the processor of the electronic device, further cause the electronic device to:

receive a second write command comprising a plurality of logical addresses associated with the memory system;

update, at the buffer of the memory system, mappings between each logical address of the plurality of logical addresses and a corresponding physical address of the non-volatile memory cells based at least in part on receiving the second write command;

receive a second read command comprising a subset of the plurality of logical addresses based at least in part on updating the mappings between each logical address of the plurality of logical addresses and the corresponding physical address of the non-volatile memory cells; and read, using the updated mappings at the buffer of the memory system, physical addresses of the non-volatile memory cells corresponding to the subset of the plurality of logical addresses based at least in part on receiving the second read command.

15. The non-transitory computer-readable medium of claim 14, wherein the instructions, when executed by the processor of the electronic device, further cause the electronic device to:

maintain the updated mappings between each logical address of the plurality of logical addresses and the corresponding physical address of the non-volatile memory cells in the buffer of the memory system for a second duration, wherein reading the physical addresses of the non-volatile memory cells corresponding to the subset of the plurality of logical addresses occurs during the second duration.

16. The non-transitory computer-readable medium of claim 11, wherein the instructions, when executed by the processor of the electronic device, further cause the electronic device to:

write data to the physical address of the non-volatile memory cells based at least in part on receiving the write command.

17. The non-transitory computer-readable medium of claim 11, wherein the read command comprises a random read command.

18. A method, comprising:

receiving a write command comprising a logical address associated with a memory system comprising non-volatile memory cells;

updating, at a buffer of the memory system, a mapping between the logical address and a physical address of the non-volatile memory cells based at least in part on receiving the write command;

transferring information stored in the buffer to the non-volatile memory cells based at least in part on updating the mapping in the buffer;

maintaining the updated mapping in the buffer of the memory system for a duration based at least in part on the write command comprising a random write command and based at least in part on transferring the information stored in the buffer to the non-volatile memory cells, wherein the duration is based at least in part on a duration for performing at least one subsequent operation;

receiving a read command comprising the logical address based at least in part on updating the mapping between the logical address and the physical address of the non-volatile memory cells;

reading, during the duration and using the updated mapping stored in the buffer of the memory system, the physical address of the non-volatile memory cells corresponding to the logical address based at least in part on receiving the read command; and removing the mapping from the buffer in accordance with expiration of the duration.

\* \* \* \* \*